United States Patent
Oh et al.

(10) Patent No.: US 7,466,071 B2
(45) Date of Patent: Dec. 16, 2008

(54) BALLISTIC ELECTRON SURFACE-EMITTING DEVICE EMITTER, AND FIELD EMISSION DISPLAY AND FIELD EMISSION-TYPE BACKLIGHT DEVICE USING THE SAME

(75) Inventors: Tae-Sik Oh, Suwon-si (KR); Jong-Min Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 509 days.

(21) Appl. No.: 11/063,965

(22) Filed: Feb. 24, 2005

(65) Prior Publication Data
US 2005/0184642 A1    Aug. 25, 2005

(30) Foreign Application Priority Data
Feb. 24, 2004    (KR) .................... 10-2004-0012326

(51) Int. Cl.
*H01J 1/02* (2006.01)
*H01J 1/304* (2006.01)
(52) U.S. Cl. .................... 313/495; 313/311; 313/310
(58) Field of Classification Search ......... 313/309–311, 313/495–497
See application file for complete search history.

(56) References Cited

U.S. PATENT DOCUMENTS 6,642,639 B2 * 11/2003 Choi et al. .................. 313/309

2003/0087511 A1 * 5/2003 Hidaka et al. ............... 438/584
2003/0178934 A1 * 9/2003 Jeong et al. ................. 313/495
2005/0151456 A1 * 7/2005 Yoon et al. .................. 313/311

OTHER PUBLICATIONS

Uno et al., "New Insights in High-Energy Electron emission and underlying Transport physics of Nano crystalline Si",Dec. 2003, IEEE transactions on Nanotechnology, vol. 2, No. 4, pp. 301-307.*
Yoshiki et al., "Generation of Ballistic electrons in nanocrystalline porous silicon layers and its application to solid state luminescent device"., Sep. 23, 2002, Applied Physics letters, vol. 81., No. 13, pp. 2472-2474.*
Javey et al., "Ballistic carbon nanotube field-effect transistors", Aug. 2003, Nature, vol. 424, pp. 654-657.*

* cited by examiner

*Primary Examiner*—Karabi Guharay
(74) *Attorney, Agent, or Firm*—Robert E. Bushnell, Esq.

(57) ABSTRACT

A ballistic electron surface-emitting device (BSD) emitter that can be used in a field emission display (FED). The emitter being made of metallic carbon nanotubes extending in a direction that is normal to a surface of the cathode. The carbon nanotubes are designed so that electrons therein can experience a ballistic effect where the mean free path between collisions is as large or larger than a length of the carbon nanotube and that the width of the carbon nanotube being a fermi wavelength. On an opposite end of the carbon nanotubes is a thin metal electrode layer and a thin insulating layer to protect the carbon nanotubes from damage.

2 Claims, 5 Drawing Sheets

BALLISTIC ELECTRON SURFACE-EMITTING DEVICE EMITTER, AND FIELD EMISSION DISPLAY AND FIELD EMISSION-TYPE BACKLIGHT DEVICE USING THE SAME

CLAIM OF PRIORITY

This application makes reference to, incorporates the same herein, and claims all benefits accruing under 35 U.S.C. §119 from an application for BALLISTIC ELECTRON SURFACE-EMITTING DEVICE EMITTER, AND FIELD EMISSION DISPLAY AND FIELD EMISSION-TYPE BACKLIGHT DEVICE USING THE SAME earlier filed in the Korean Intellectual Property Office on 24 Feb. 2004 and there duly assigned Ser. No. 2004-12326.

BACKGROUND OF THE INVENTION

1. Field of the Invention

The present invention relates to a ballistic electron surface-emitting device (BSD) emitter, a field emission display (FED) using the BSD emitter, and a field emission-type backlight device using the BSD emitter.

2. Description of the Related Art

Displays play an important role in information and media delivery and are widely used in personal computer monitors and television sets. Displays are usually either cathode ray tubes (CRTs) which use high speed thermal electron emission or flat panel displays, which are rapidly developing. The types of flat panel displays include liquid crystal displays (LCDs), plasma display panels (PDPs), field emission displays (FEDs), and others.

In FEDs, when a strong electric field is applied between a gate electrode and emitters arranged at a predetermined distance on a cathode electrode, electrons are emitted from the emitters and collide with fluorescent materials on the anode electrode, thus emitting light. Thus, FEDs are displays that form an image using electrons of a cold cathode as an electron-emitting source. The image qualities of FEDs are highly affected by the characteristics of the emitter, such as the structure and materials, etc.

Therefore, what is needed is an improved design for an emitter and an improved design for an FED using the improved emitter that results in improved image quality. Furthermore, what is needed is a ballistic electron emitter and an FED using the same that can attain stable and uniform electron emission properties.

SUMMARY OF THE INVENTION

It is therefore an object of the present invention to provide for an improved emitter for an FED.

It is further an object to provide a design for an emitter for an FED and an FED using the same that operates using ballistic electrons.

It is still an object of the present invention to provide an emitter for an FED that is made out of carbon nanotubes and that allows for ballistic electron movement.

It is further an object of the present invention to provide an FED using carbon nanotubes in BSD emitters where the carbon nanotubes are protected from damage and are durable.

It is also an object of the present invention to provide an FED using carbon nanotubes in BSD emitters that is easy to manufacture.

It is also an object of the present invention to employ BSD emitters in a display that does not require a perfect vacuum.

It is further an object of the present invention to provide a ballistic electron surface-emitting device (BSD) emitter which can emit stable and uniform ballistic electrons for a long time.

It is still an object of the present invention to provide a field emission display (FED) manufactured using the BSD emitter.

It is yet an object of the present invention to provide a field emission-type backlight device manufactured using the BSD emitter.

These and other objects can be achieved with a BSD emitter that includes a rear substrate, a cathode electrode formed on the rear substrate, carbon nanotubes extending perpendicularly from cathode electrode and used as materials for conducting ballistic electrons, and a thin metal electrode layer formed on top of the carbon nanotubes.

According to another aspect of the present invention, there is provided a field emission display that includes the above BSD emitter, and a front substrate located opposite to the BSD emitter and spaced apart from the BSD emitter by a predetermined distance, an anode electrode and a fluorescent layer having a pattern and being sequentially formed on a surface of the front substrate.

According to still another aspect of the present invention, there is provided a field emission-type backlight device including the above BSD emitter, and a front substrate located opposite to the BSD emitter and spaced apart from the BSD emitter by a predetermined distance, an anode electrode and a fluorescent layer and being sequentially formed on a surface of the front substrate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
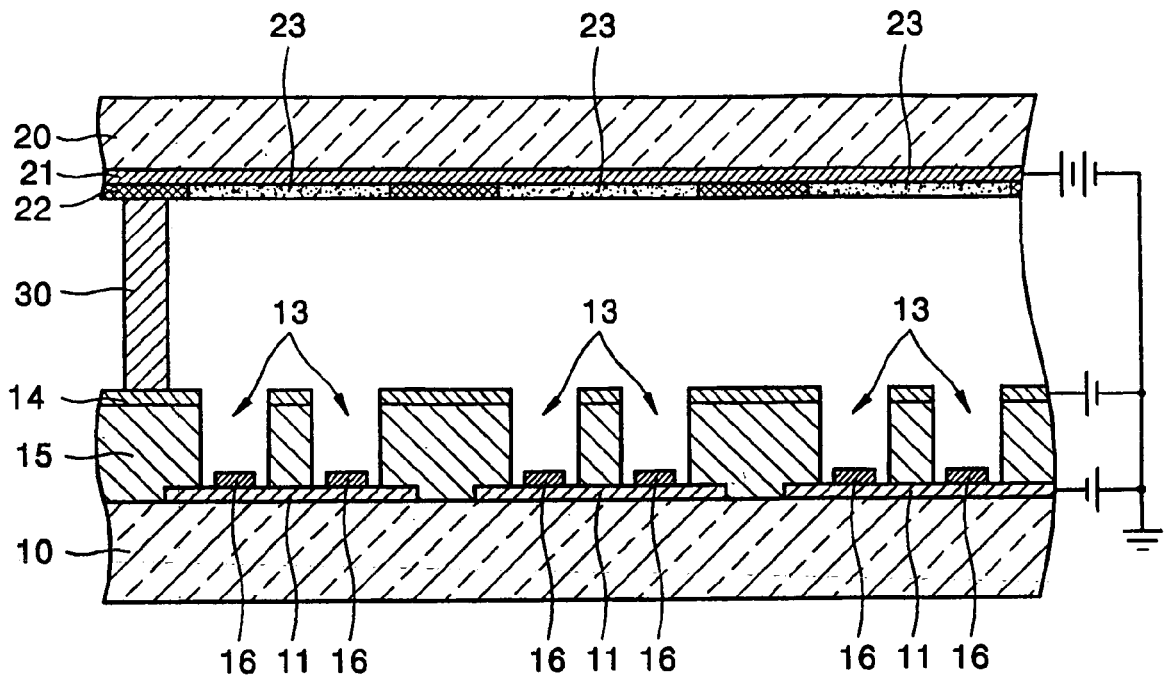
FIG. 1A is a partial cross-sectional view illustrating a field emission display (FED)
Figure 1B:
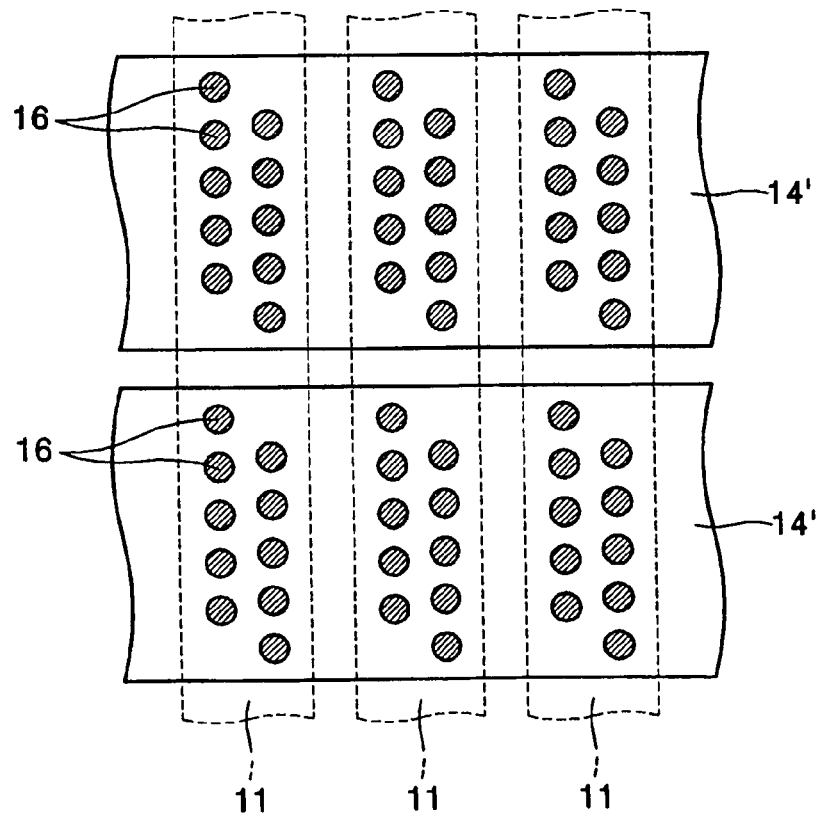
FIG. 1B is a partial top view illustrating the FED of FIG. 1A.

Turning now to the figures, FIG. 1A is a partial cross-sectional view illustrating an FED. FIG. 1B is a partial top view illustrating the FED of FIG. 1A. Referring to FIGS. 1A and 1B, the FED has a triode structure, i.e., a cathode electrode 11, an anode electrode 21, and a gate electrode 14. The cathode electrode 11 and the gate electrode 14 are formed on a rear substrate 10. The anode electrode 21 is formed on a bottom surface of a front substrate 20. A fluorescent layer 23 made of R, G, and B fluorescent materials and black matrixes 22 for improving contrast are formed on a bottom surface of the anode electrode 21. A spacer 30 is provided between the rear substrate 10 and the front substrate 20 to maintain a predetermined distance. The FED has the structure where the cathode electrode 11 is formed on the rear substrate 10, an insulating layer 15 having fine openings 13 and the gate electrode 14 are sequentially formed on the rear substrate 10, and emitters 16 are formed on the cathode electrode 11 within the openings 13.

Spindt-type metal tips (or micro-tips), which are mainly made of molybdenum (Mo), have been used as the emitters 16 in initially developed FEDs. In FEDs having such metal tips, superfine holes must be formed for the emitters to reside therein and uniform metal micro-tips must be formed through the picture region by deposition of molybdenum. However, it is difficult to make all the emitters in an FED to have uniform characteristics. The manufacturing process of such emitters is highly complex and requires high technology and expensive equipment. Further, it is difficult to manufacture large displays using the metal tips.

Figure 2:
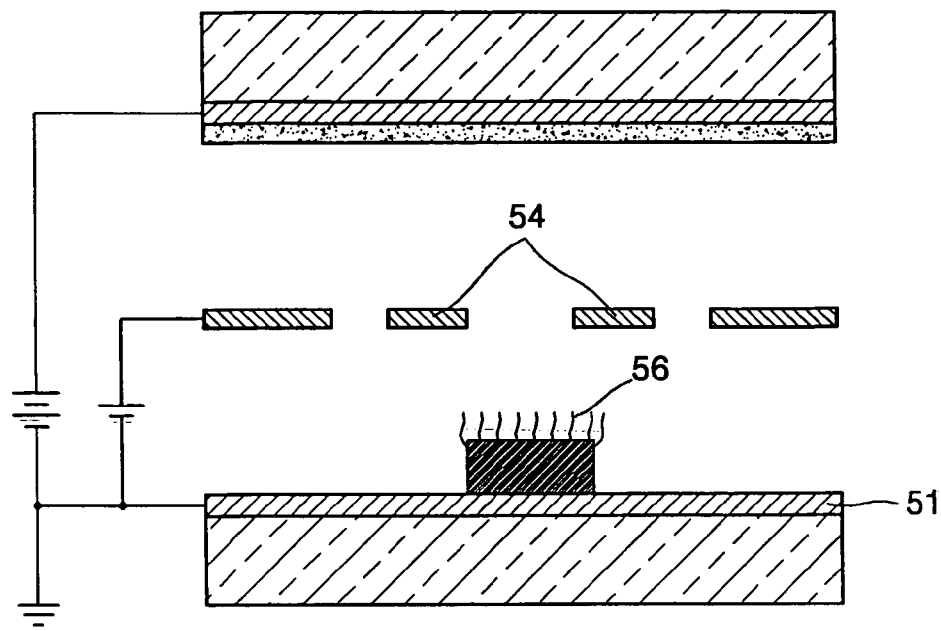
FIG. 2 is a schematic view illustrating an FED using carbon nanotubes.

Accordingly, there have been many attempts to simplify the manufacturing process and manufacture large displays using carbon nanotubes as emitters. Turning to FIG. 2, FIG. 2 illustrates one example of carbon nanotubes being used as emitters in an FED display. In FIG. 2, reference numerals 51 and 54 represent a cathode electrode and a gate electrode, respectively. As illustrated in FIG. 2, carbon nanotubes having a nano-sized diameter and a high aspect ratio (length/diameter ratio) can be used as emitters 56 in a simple manner using screen printing or using a synthesis apparatus. However, tip portions, which are the most important portions of the carbon nanotubes, lack durability because they deteriorate or break during the on/off operations, especially when the carbon nanotubes function as cold emitters. It is believed that the reason why the emitters deteriorate or break is because when accelerated electrons collide with a fluorescent body to emit light, cations are isolated from the fluorescent body and are also accelerated and collide with the emitters.

A further problem is that when the carbon nanotubes are placed close together, aspect ratios of the carbon nanotubes decrease and a threshold voltage increases, thus attenuating the advantages of the carbon nanotubes. Thus, it is necessary to arrange carbon nanotubes to have constant spaces therebetween, which is a complicated process.

To overcome these problems of the above tip-type emitters, flat-type emitters have been developed. The flat-type emitters include emitters using diamond-like carbon, surface conduction emitters, metal-insulator-metal (hereinafter, referred to as "MIM") emitters, and BSD emitters.

Figure 3:
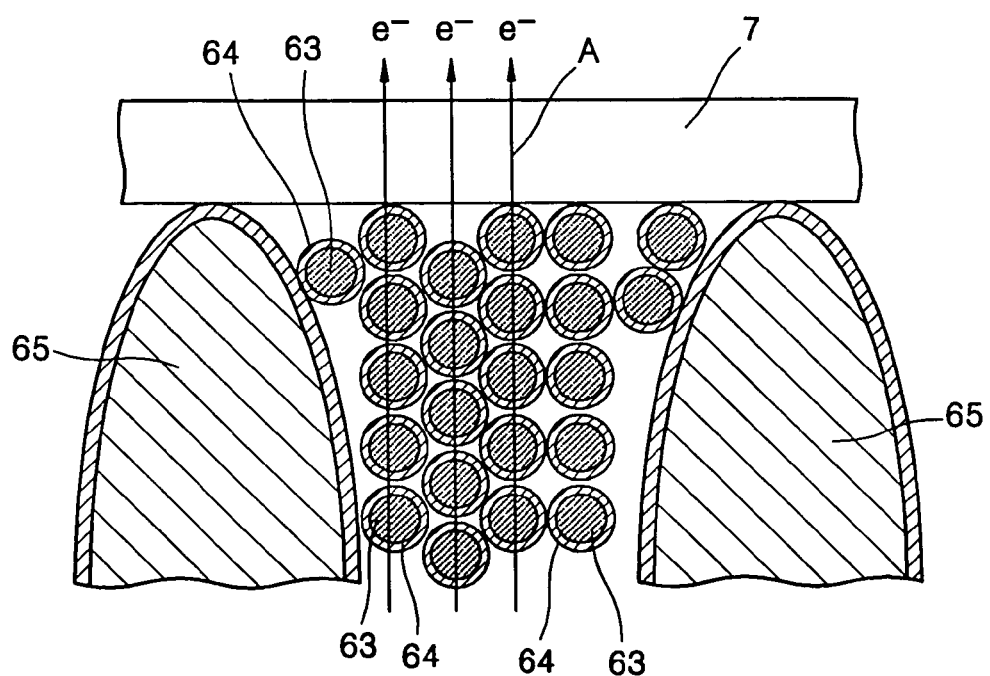
FIG. 3 is a partial cross-sectional view illustrating the structure of a ballistic electron surface-emitting device (BSD) emitter using porous polysilicon (PPS) and the operating principle.

MIM and BSD emitters do not need high vacuum or a separate component for focusing electron beams. These emitters have a driving voltage of 20 V or less and their surfaces are resistant to contamination. Although a field emission device using a BSD emitter as illustrated in FIG. 3 pertains to FEDs, the BSD emitter is based on technology of cold cathode electron source applying nano-technology, in which the principle of electron emission is different from that of conventional tip-type emitters.

Figure 4:
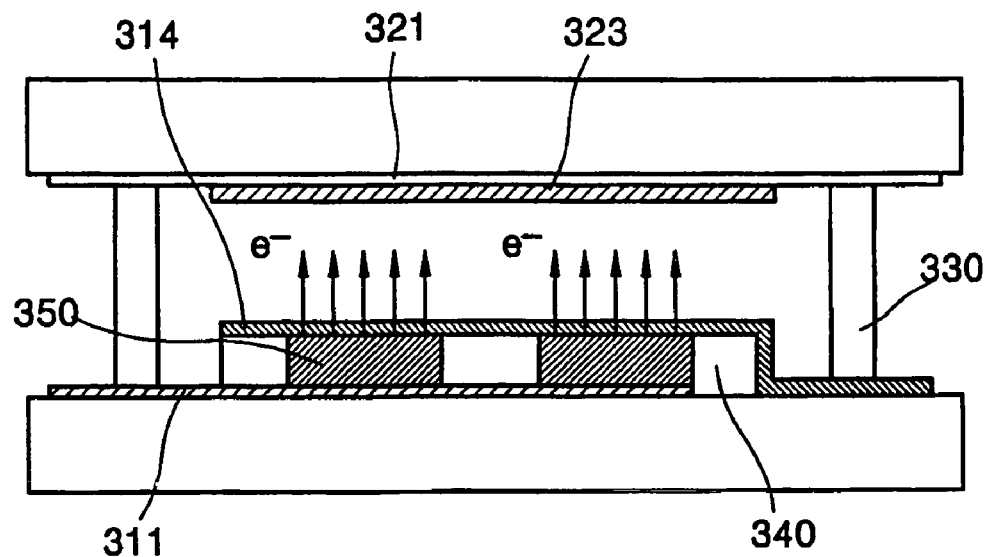
FIG. 4 is a schematic view illustrating the structure of an FED using a BSD emitter using PPS.

Turning now to FIG. 4, FIG. 4 is a schematic view illustrating the structure of an FED using a BSD emitter using porous polysilicon (PPS). Referring FIG. 4, a nano-crystal structure of porous polysilicon thin layer 350 is formed on a glass substrate and an oxidation layer of polysilicon 340 is formed around the porous polysilicon thin layer 350. Then, an electrode layer 314 of gold, for example, is formed on a surface of the porous polysilicon thin layer 350 and the oxidation layer 340. An anode electrode 321 and a fluorescent layer 323 are sequentially formed on a surface of another glass substrate. Reference numeral 330 represents a spacer used to space apart the two glass substrates where there is a vacuum there between. When a voltage is applied between the electrodes 311 and 321 in the BSD, electrons penetrate the nano crystal structure are accelerated without substantial collision and emitted into the vacuum (ballistic electron emission phenomenon).

The above PPS is produced by immersing an n-type doped silicon wafer into an aqueous ethanol solution containing HF and performing an electrochemical oxidation. However, it is difficult to attain formation and fixing of an oxidation layer of PPS. Electron emission properties of the PPS produced using the method are very sensitive to the conditions of the electrochemical oxidation and the temperature of the substrate during sealing and venting. Thus, it is difficult to attain stable and uniform electron emission properties.

Liquid crystal displays (LCDs), which pertain to light receiving-type flat panel displays, have a light weight and consume less electric power. However, LDCs themselves cannot emit light to form images. They may form images by using light entering from the outside. Thus, backlight devices are installed in a rear side of the LCDs.

In the past, cold cathode fluorescent lamps (CCFLs), which are line light sources, and light emitting diodes (LEDs), which are point light sources, were mostly used as backlight devices. However, in general, the conventional backlight devices have a complicated construction, thus being quite expensive. Furthermore, light sources are located on the lateral sides of the conventional backlight devices and thus, due to the reflection and transmission of light, the consumption of electric power increases. Especially, as LCDs become larger, it is more difficult to ensure a uniform brightness of a backlight device.

Figure 5:
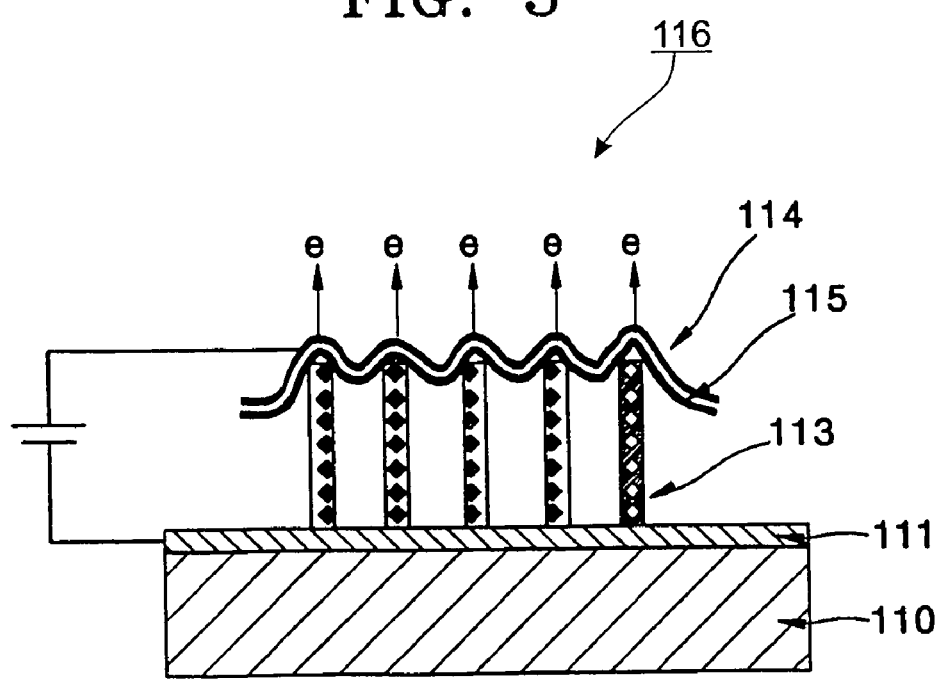
FIG. 5 is a partial cross-sectional schematic view illustrating a BSD emitter according to an embodiment of the present invention.

Turning now to FIG. 5, FIG. 5 is a partial cross-sectional schematic view illustrating a BSD emitter 116 according to an embodiment of the present invention. As illustrated in FIG. 5, conduction of electrons within vertically-aligned carbon nanotubes (i.e., arranged perpendicular or normal to a top surface of the cathode electrode) used in the present embodiment has a ballistic electron transmittance property. Ballistic electron transmitting conductor refers to a conductor in which electrons can move without colliding, the electrons have energy corresponding to a voltage applied between an anode electrode and a cathode electrode. It was believed that such ballistic electrons were generated only under high vacuum. However, it has been found that ballistic electron transmittance can also occur within a solid phase by using nano technology, and thus the electrons can ballistically move similar to that of a vacuum.

The emitters using porous polysilicon (PPS) as described above in conjunction with FIG. 4 have such ballistic electron transmittance within a solid. Mean free path refers to an average or mean distance electrons travel prior to colliding with atoms and electrons constituting a solid when an electron travels in an infinitely large silicon crystal. The mean free path of n-type Si is about 100 nm. If silicon is in the form of a nano-crystal having a size of much less than 100 nm, the size of the nano crystal is less than the mean free path, and thus a probability that the electrons will collide with silicon atoms when the electrons travel through the silicon nano crystals is very low.

Turning to FIG. 3, FIG. 3 illustrates an example of ballistic electron movement in a PPS solid. In FIG. 3, reference numeral 7 is a metal electrode and reference numeral 63 is a silicon nanocrystal, reference numeral 64 is an oxidation layer and reference numeral 65 is a poly silicon grain. As illustrated in FIG. 3, when the silicon nano crystals 63 are separated from each other by an oxidation layer 64, the ballistic electron transmittance phenomenon can occur in a solid, and thus behave as when in a vacuum. Contrary to this, when electrons frequently collide with impurities or defects in a conductor, the electrons are "diffusive".

Figure 6:
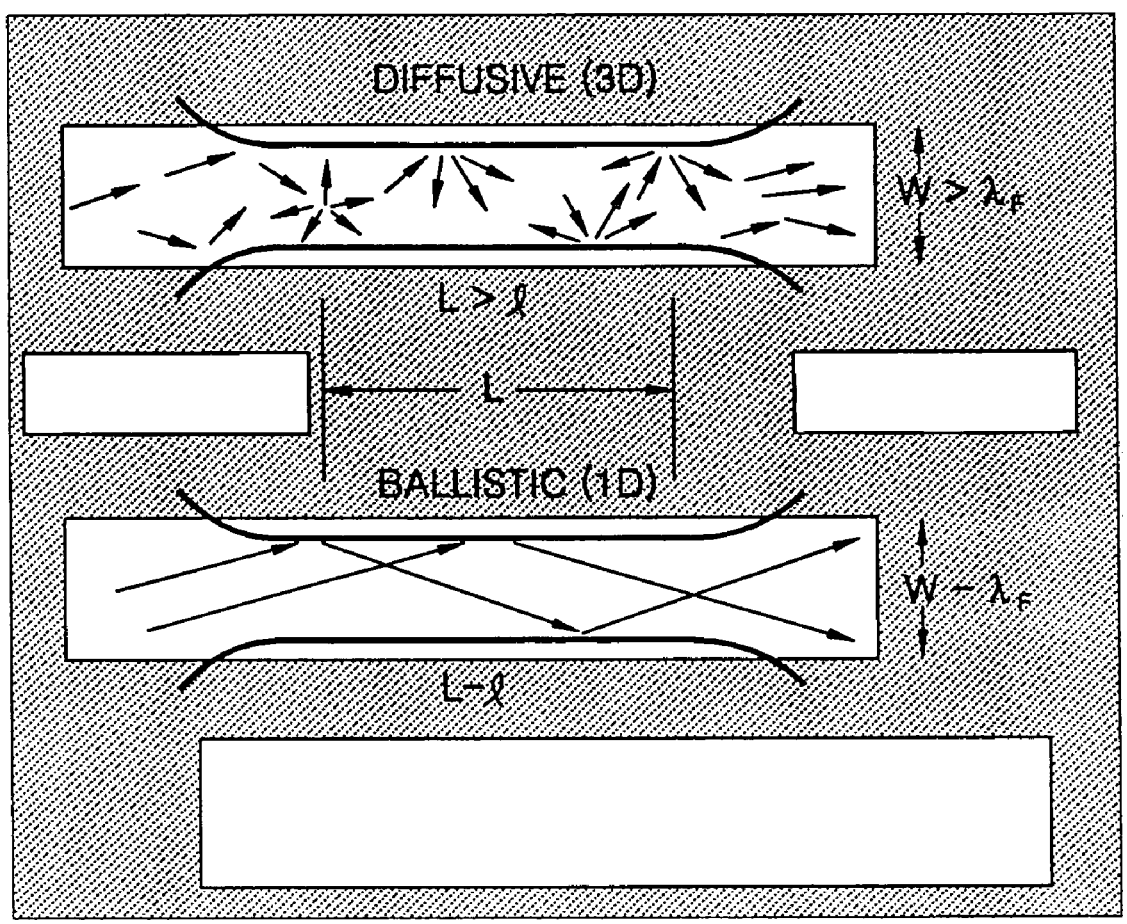
FIG. 6 is a schematic view illustrating a ballistic electron transmittance phenomenon.

Ballistic electron transmittance can be also observed in carbon nanotubes, since carbon nanotubes have a diameter and a length in ranges controlled by quantum mechanics. Conductivity is not reduced in inverse proportion to the length, but is given by quantized value. As illustrated in FIG. 6, the diameter of a carbon nanotube is nano-sized, and thus electrons are constrained in a diameter direction, but can be transmitted in a longitudinal direction. It is believed that due to the one-dimensional state of the carbon nanotubes as illustrated in FIG. 6, a ballistic electron transmittance property can be attained. That is, it is believed that when a length L of a carbon nanotube is substantially identical to a mean free path l of transmitting electrons and a diameter W of a carbon nanotube is similar to Fermi wave length $\lambda_F$, a ballistic electron transmittance property can be attained.

According to an embodiment of the present invention, a ground or negative voltage is applied to the cathode electrode in the BSD emitter and a positive voltage is applied to the thin metal electrode layer, and $I_{CNT}$ current (i.e., the current flowing through the carbon nanotubes) flows between the two. However, the FED of FIG. 2 uses CNTs as cold emitters does not contain such a thin metal electrode layer as in FIG. 5. The FED of FIG. 2 contains just a gate electrode as a withdrawal electrode for emitting electrons. There is no current between the gate electrode and the cathode electrode in the FED of FIG. 2.

The carbon nanotubes used in the BSD emitter according to an embodiment of the present invention may be single-walled or multi-walled. Electrical conductivity of the carbon nanotubes may be non-conductive, semiconductive, or metallic. When the perpendicularly oriented carbon nanotubes are metallic carbon nanotubes, an insulating layer may be sandwiched between the carbon nanotubes and the thin metal electrode layer. Without an insulating layer, there is a risk that a short-circuit between the carbon nanotubes and the thin metal electrode layer will occur.

The vertically-aligned carbon nanotubes used according to an embodiment of the present invention may have a maximum length L of 2 μm. If the vertically-aligned carbon nanotubes have a length L greater than 2 μm, a probability of ballistic electron transmittance may be decreased and a probability that electron transmittance will be diffusive may be increased, respectively, which is disadvantageous.

The vertically-aligned carbon nanotubes can be produced using any conventional method, for example, CVD growth method, template method, or self-assembly monolayer (SAM) method. In the CVD growth method, a metal catalyst such as a transition metal such as iron (Fe), cobalt (Co), and/or nickel (Ni), is formed in a form of a highly dispersible nanoparticle on a substrate, and then the substrate is charged into a quartz boat. Then, carbon source gas, such as methane, ethylene, or acetylene, is injected into the boat at a constant flow rate and at a high temperature to obtain carbon nanotubes. The transition metal particles function not only as catalyst but also as nucleus grains of carbon nanotubes. Thus, carbon nanotubes are formed in a high density and grow vertically.

In the template method, a template made of anodic aluminum oxide (AAO) is used. Catalysts are electrically deposited to the ends of pores in the template, and then the template is subjected to a thermal CVD to obtain carbon nanotubes. The resultant carbon nanotubes have a highly uniform diameter and excellent vertical alignment along a length of the pore.

In the SAM method, carbon nanotubes are substituted with carboxyl groups at their ends to obtain shorter carbon nanotubes, and then the short carbon nanotubes are washed with distilled water. Next, the ends of the carbon nanotubes are reduced to —OH group using $BH_3$—THF, substituted with —Cl using $SOCl_2$, and then substituted with —SH group using KSH. Then, the resultant carbon nanotubes are allowed to self-assemble on a thin metal layer, such as Au, to obtain the vertically-aligned carbon nanotubes. According to an embodiment of the present invention, the substrate on which the vertically-aligned carbon nanotubes are grown may also be directly used as the cathode electrode.

Referring to FIG. 5, the thin metal electrode layer 114 used in the BSD emitter 116 may be made of Au, Cr, or Cr—Ni alloy and may be oriented perpendicular to the cathode electrode 111. This is advantageous since a matrix can be driven in a passive driving mode by making the thin metal electrode layer 114 perpendicular to the cathode electrode 111. The thin metal electrode layer 114 (stripe type) perpendicularly crosses the cathode electrode 111 (stripe type) when looking at the plan view of the substrate so that the field emission display and the field emission-type backlight device can be driven by matrix addressing.

According to another embodiment of the present invention, the thin metal electrode layer 114 may have a thickness of 15 to 30 nm. If the thin metal electrode layer 114 has a thickness less than 15 nm, there is a possibility that a portion of the thin metal electrode layer 114 will not be formed. If the thin metal electrode layer 114 has a thickness greater than 30 nm, it becomes more difficult for ballistic electrons to permeate the thin metal electrode layer 114.

The insulating layer 115 may be made of $SiO_2$ and have a thickness of 10 to 100 nm. If the insulating layer 115 has a thickness less than 10 nm, there is a risk that a short-circuit between the metallic carbon nanotubes 113 and the thin metal electrode layer 114 will occur. If the insulating layer 115 has a thickness greater than 100 nm, it is more difficult for ballistic electrons to permeate the thin metal electrode layer 114.

The construction of the BSD emitter 116 is described as follows. A plurality of cathode electrodes 111 are formed spaced from each other by a predetermined distance and in a predetermined pattern, for example, stripes, on a rear substrate 110. The cathode electrodes 111 can be formed by depositing a conductive metal material or a transparent conductive material, such as indium tin oxide (ITO) on the rear substrate 110 to a predetermined thickness, for example, approximately several hundred Å to several thousand Å (i.e., several microns) and patterning the deposited material into stripes. Next, the carbon nanotubes 113 are vertically aligned on the patterned cathodes (i.e., oriented and extending perpendicularly from the surface of the cathode electrode). When the vertically-aligned carbon nanotubes 113 are metallic, an insulating layer 115 having a thickness of several tens of nm is formed on a surface of the vertically-aligned carbon nanotubes 113. Then, the thin metal electrode layer 114 having a thickness of 15 to 30 nm is formed on the insulating layer 115, the thin metal electrode layer 114 being perpendicular to the cathode electrode 111, to obtain the BSD emitter. The thin metal electrode layer 114 can be patterned in stripes. The thin metal electrode layer 114 (stripe type) perpendicularly crosses the cathode electrode 111 (stripe type) so that the field emission display can be driven by matrix addressing.

In an embodiment of the present invention, since the insulating layer 115 and the thin metal electrode layer 114 are sequentially formed on the vertically-aligned carbon nanotubes 113, an adverse effect of gas or contamination that ordinarily occurs during production of the cathode can be prevented. Also, deterioration of the carbon nanotubes that ordinarily occurs during the sealing or venting process can be minimized. An FED according to an embodiment of the present invention includes the above BSD emitter 116 and a front substrate located opposite to the BSD emitter 116 and spaced apart from the BSD emitter 116 by a predetermined distance, an anode electrode and a fluorescent layer having a pattern being sequentially formed on a surface of the front substrate.

Figure 7:
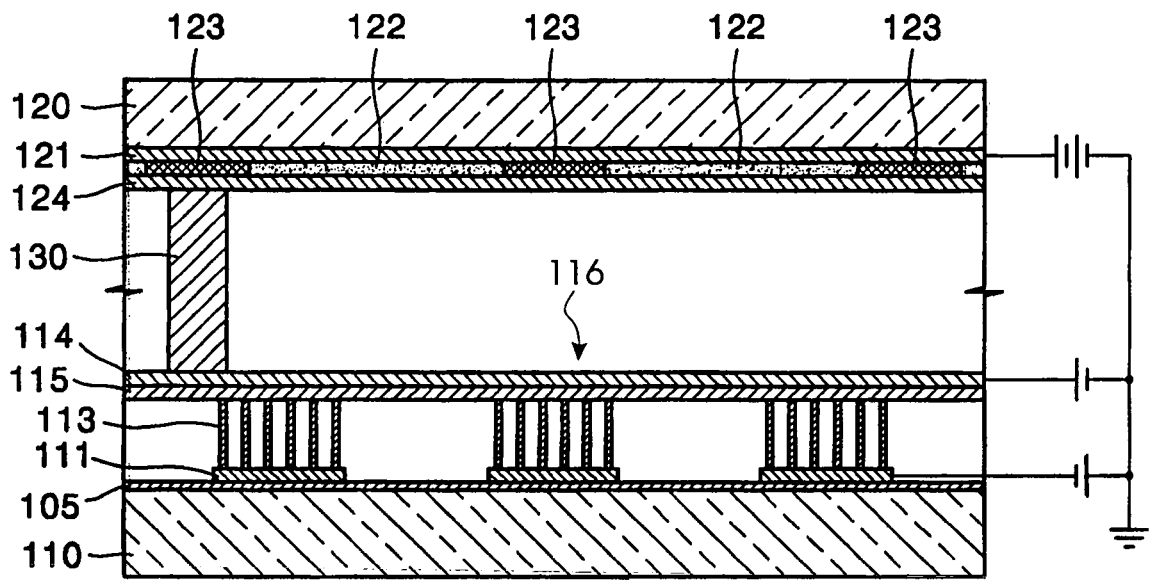
FIG. 7 is a cross-sectional view illustrating an FED according to an embodiment of the present invention.

Turning now to FIG. 7, FIG. 7 is a cross-sectional view illustrating an FED according to the present embodiment. Referring to FIG. 7, the FED includes two substrates, i.e., a rear substrate 110 and a front substrate 120 spaced apart a predetermined distance and opposite from each other. A spacer 130 is sandwiched between the rear substrate 110 and the front substrate 120 to maintain a predetermined distance therebetween. In general, glass substrates are used for both the rear substrate 110 and the front substrate 120.

The BSD emitter 116 according to the embodiment of FIG. 7 as a component for accomplishing field emission is located on the rear substrate 110 and a component for embodying a predetermined image using electrons emitted from the BSD emitter 116 is located on the front substrate 120. Referring to FIG. 7, an anode electrode 121 is formed on a bottom surface of the front substrate 120, which is opposite to the rear substrate 110. A fluorescent layer 123 having of R, G, and B fluorescent material is formed on a surface of the anode electrode 121, the fluorescent layer 123 being patterned and being between black matrixes 122 in the case of the embodiment of FIG. 7. The anode electrode 121 is made of a transparent conductive material ITO (indium tin oxide) to permeate visible light emitted from the fluorescent layer 123. The R, G, and B fluorescent bodies making up the fluorescent layer 123 have a longitudinal pattern extending in the longitudinal direction of the cathode electrode 111. When a substrate on which the vertically-aligned carbon nanotubes were grown is used as the cathode electrode 111, a conductive layer 105 made of metal may be interposed between the cathode electrode 111 and the rear substrate 110 to allow electrical conduction therebetween. Black matrixes 122 may be located between the fluorescent bodies 123 on a bottom surface of the anode electrode 121 to improve the contrast of images.

A thin metal layer 124 may be formed on the fluorescent layer 123 and the black matrixes 122. The thin metal layer 124 is mainly made up of aluminum and has a thickness of about several hundred Å to allow electrons emitted from the BSD emitters 116 to easily permeate. The thin metal layer 124 functions to increase the brightness of the FED. In detail, when the R, G, and B fluorescent bodies of the fluorescent layer 123 are excited by electron beams emitted from the BSD emitter 116 and thus emit visible light, the emitted visible light is reflected by the thin metal layer 124. Thus, the light intensity of the visible light going forward is increased, resulting in an increase of brightness.

On the one hand, when the thin metal layer 124 is formed on the front substrate 120, it is possible to exclude the formation of the anode electrode 121. The thin metal layer 124 is conductive, and thus when a voltage is applied to the thin metal layer 124, the thin metal layer 124 can be substituted for the anode electrode 121.

The rear substrate 110 and the front substrate 120 are spaced apart from each other by a predetermined distance such that the BSD emitter 116 and the fluorescent layer 123 are located opposite to each other. A sealing agent (not illustrated) is applied to the edges of the rear substrate 110 and the front substrate 120 to seal them. As describe above, the spacer 130 is sandwiched between the rear substrate 110 and the front substrate 120 to space them apart by a predetermined distance.

The operation of the above FED will now be explained. In the FED according to the present invention, when a driving voltage is applied between the cathode electrode 111 and the thin metal electrode layer 114, electrons from the cathode electrode 111 are injected into the carbon nanotubes 113. Then, the electrons enter the thin metal electrode layer 114 by the ballistic electron transmittance phenomenon and are emitted under vacuum by tunneling. Such electron emission due to the ballistic electron transmittance phenomenon allows for high energy electrons, resulting in low scattering. Thus, color purity may be improved even without using a separate focusing electrode. Further, since the ballistic electrons have high energy and are hardly affected by residual gas, it is not essential to hold high vacuum. Thus, it is possible to realize a thin display having better practicability.

The emitted electrons are directed to the fluorescent layer 123 by a voltage applied between the cathode electrode 111 and the anode electrode 121 and collide with the fluorescent layer 123. Accordingly, the R, G, and B fluorescent bodies of the fluorescent layer 123 are excited to emit visible light.

Figure 8:
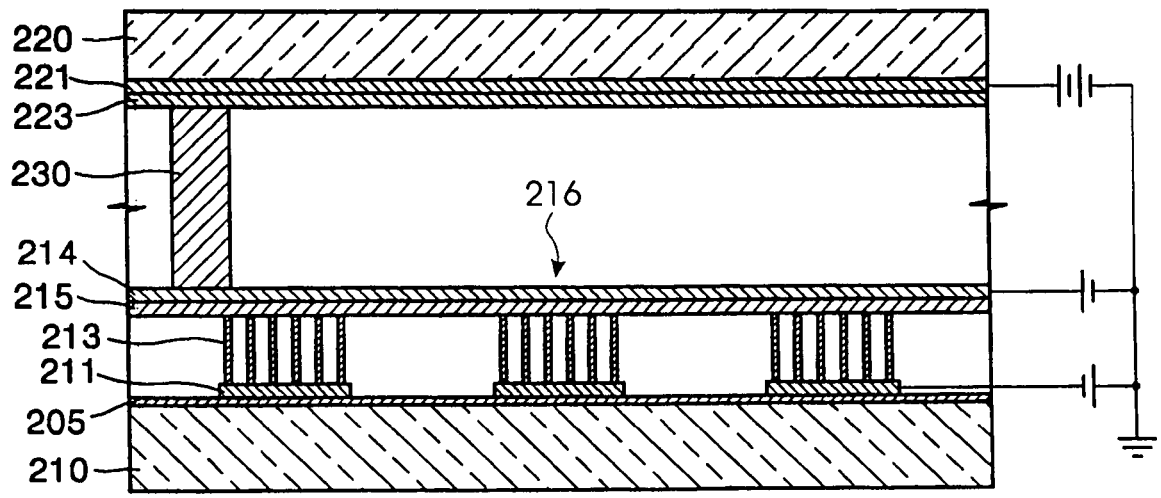
FIG. 8 is a cross-sectional view illustrating a field emission-type backlight device according to another embodiment of the present invention.

Turning now to FIG. 8, FIG. 8 illustrates a cross sectional view of a field emission-type backlight device according to still another embodiment of the present invention. The FED of FIG. 8 includes the above BSD emitter 216 and a front substrate 220 located opposite to the BSD emitter 216 and spaced apart from the BSD emitter 216 by a predetermined distance, an anode electrode 221 and a fluorescent layer 223 being sequentially formed on a surface of the front substrate 220. Referring to FIG. 8, the field emission-type backlight device includes two substrates, i.e., a rear substrate 210 and a front substrate 220 spaced apart from each other by a predetermined distance by spacer 230, the two substrates being opposite to each other. The spacer 230 is sandwiched between the rear substrate 210 and the front substrate 220 to maintain a predetermined distance therebetween. In general, a glass substrates are used for both the rear substrate 210 and the front substrate 220.

The BSD emitter 216 according to this embodiment of the present invention, as a component for accomplishing field emission, is located on the rear substrate 210. An anode electrode 221 and a fluorescent layer 223, as components for emitting visible light due to fluorescent materials excited by electrons emitted from the BSD emitter 216, are sequentially located on a bottom surface of the front substrate 220. In the embodiment of FIG. 8 for a field emission-type backlight device, unlike the embodiment of FIG. 7, the fluorescent layer in FIG. 8 is not patterned and there is no black matrix present. The fluorescent layer 223 in the field emission-type backlight device of FIG. 8 is generally not patterned since the backlight device does not make images but is used as a light source. In contrast, in the FED of FIG. 7, the fluorescent layer 123 has a pattern that is used to form images. The rear substrate 210 and the front substrate 220 are spaced apart from each other by a predetermined distance such that the BSD emitter 216 and the fluorescent layer 223 are located opposite to each other. A sealing agent (not illustrated) is applied to the edges the rear substrate 210 and the front substrate 220 to seal them together. A spacer 230 is sandwiched between the rear substrate 210 and the front substrate 220 to maintain a predetermined distance therebetween.

The field emission-type backlight device of FIG. 8 consumes less electric power than conventional backlight devices, for example, using cold cathode fluorescent lamps. Further, the field emission-type backlight device has the advantage of relatively uniform brightness even though a light emitting area is large.

As described above, the BSD emitter 216 according to the embodiment of FIG. 8 can be easily produced. The carbon nanotubes 213 used in the BSD emitter 216 function not as cold emitters, but as routes for transferring ballistic electrons. In addition, with the designs of FIGS. 5, 7 and 8, there is no risk that the carbon nanotubes will deteriorate or break during the on/off operation. Thus, the carbon nanotubes 213 and the BSD emitters 216 are durable. Thus, it is possible to ensure reliability with long-term driving. Further, since an insulating layer and a thin metal electrode layer are sequentially formed on the carbon nanotubes, adverse effects of gas or contamination can be prevented and deterioration of the carbon nanotubes can be minimized.

The FED according to the embodiments of the present invention can provide very high color purity even without using a separate focusing electrode and it is not essential to hold high vacuum. Further, it is unlikely to the physical and chemical properties of the carbon nanotubes can be changed during production of the display, and thus changes of operative properties of the display can be reduced, allowing increased practicability of the display.

While the present invention has been particularly illustrated and described with reference to exemplary embodiments thereof, it will be understood by those of ordinary skill in the art that various changes in form and details may be made therein without departing from the spirit and scope of the present invention as defined by the following claims.

What is claimed is:

1. A ballistic electron surface-emitting device (BSD) emitter, comprising:
   a rear substrate;
   a cathode electrode arranged on the rear substrate;
   a plurality of carbon nanotubes extending normally from the cathode electrode and to conduct ballistic electrons, each of the plurality of carbon nanotubes having tips at an end furthest from the cathode electrode, the plurality of carbon nanotubes being metallic carbon nanotubes; and
   a layer arrangement arranged on and contacting only the tips of ones of the plurality of carbon nanotubes, the layer arrangement includes an insulating layer contacting tips of ones of the plurality of carbon nanotubes and a metal electrode layer arranged on the insulating layer, the insulating layer being between 10 nm and 100 nm thick, the insulating layer including $SiO_2$.

2. A field emission display, comprising:
   the BSD emitter of claim 1; and
   a front substrate arranged opposite to the BSD emitter and spaced apart from the BSD emitter by a distance, an anode electrode and a fluorescent layer sequentially being arranged on a surface of the front substrate.

* * * * *